United States Patent
Huss et al.

(10) Patent No.: US 10,069,656 B1
(45) Date of Patent: Sep. 4, 2018

(54) METHOD FOR PREVENTING MIS-EQUALIZATIONS IN DECISION FEEDBACK EQUALIZER BASED RECEIVERS FOR LOW LOSS CHANNELS

(71) Applicant: Cadence Design Systems, Inc., San Jose, CA (US)

(72) Inventors: Scott David Huss, Cary, NC (US); Loren Blair Reiss, Raleigh, NC (US)

(73) Assignee: CADENCE DESIGN SYSTEMS, INC., San Jose, CA (US)

( * ) Notice: Subject to any disclaimer, the term of this patent is extended or adjusted under 35 U.S.C. 154(b) by 0 days.

(21) Appl. No.: 15/441,687

(22) Filed: Feb. 24, 2017

(51) Int. Cl.
*H04L 25/03* (2006.01)
*H04B 1/16* (2006.01)
*H04B 17/20* (2015.01)

(52) U.S. Cl.
CPC ......... *H04L 25/03057* (2013.01); *H04B 1/16* (2013.01); *H04B 17/20* (2015.01)

(58) Field of Classification Search
CPC ...... H04L 25/03057; H04B 17/20; H04B 1/16
See application file for complete search history.

(56) References Cited

U.S. PATENT DOCUMENTS

| | | | |
|---|---|---|---|
| 6,505,222 B1* | 1/2003 | Davis | H03M 13/00 375/233 |
| 9,160,582 B1* | 10/2015 | Huss | H04L 25/03885 |
| 2008/0107168 A1* | 5/2008 | Xia | H04L 25/03057 375/233 |
| 2010/0008414 A1* | 1/2010 | Lee | H04L 25/0307 375/233 |
| 2014/0254655 A1* | 9/2014 | Zhong | H04L 27/01 375/233 |
| 2016/0065394 A1* | 3/2016 | Sindalovsky | H04L 25/03012 375/371 |

* cited by examiner

*Primary Examiner* — Syed Haider
(74) *Attorney, Agent, or Firm* — Hunton Andrews Kurth LLP

(57) ABSTRACT

Systems and methods disclosed herein provide for preventing the mis-equalization of signals transmitted over short transmission channels. Embodiments of the systems and methods provide for a receiver including a digital receiver equalization circuit that selectively provides a correction signal to a DFE tap weight based on the value of the current DFE tap weight as well as the logical values of the in-phase and error data samples associated with received signal.

17 Claims, 6 Drawing Sheets

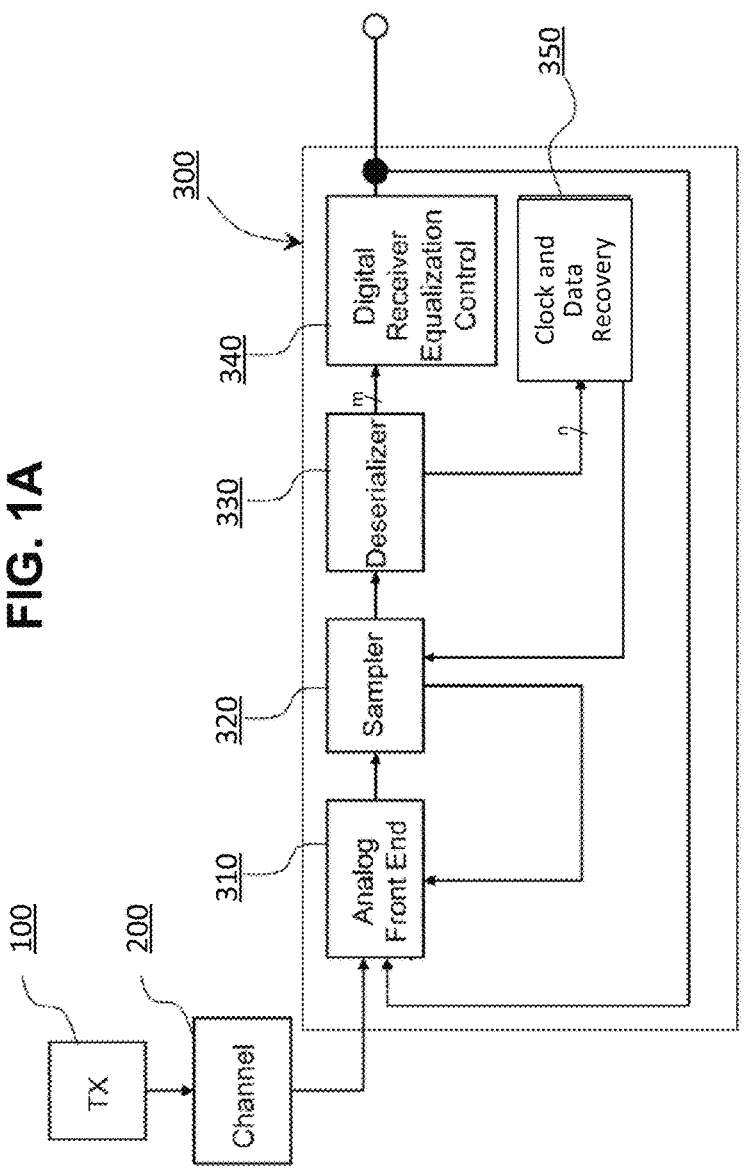

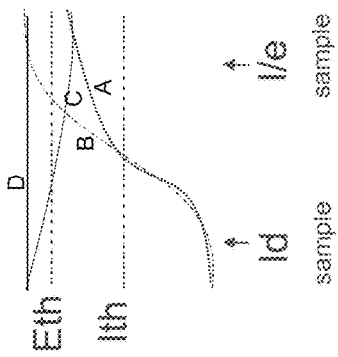

| | i | | | e | | | u/d | | Vote | Score |
|---|---|---|---|---|---|---|---|---|---|---|
| | 0 | 1 | 2 | 0 | 1 | 2 | 1 | 2 | | |
| 1 | 0 | 0 | 0 | x | 0 | 0 | 0 | 0 | 0 | 0 |
| 2 | 0 | 0 | 1 | x | 0 | 0 | n/a | n/a | n/a | n/a |
|   | 0 | 0 | 1 | x | 0 | 1 | 0 | -1 | -1 | -1 |
| 3 | 0 | 1 | 0 | x | 0 | 0 | n/a | n/a | n/a | n/a |
|   | 0 | 1 | 0 | x | 1 | 0 | -1 | 0 | -1 | -1 |
| 4 | 0 | 1 | 1 | x | 0 | 0 | n/a | n/a | n/a | n/a |
|   | 0 | 1 | 1 | x | 0 | 1 | n/a | n/a | n/a | n/a |
|   | 0 | 1 | 1 | x | 1 | 0 | n/a | n/a | n/a | n/a |
|   | 0 | 1 | 1 | x | 1 | 1 | -1 | 1 | 0 | 0 |
| 5 | 1 | 0 | 0 | x | 0 | 0 | 0 | 0 | 0 | 0 |
| 6 | 1 | 0 | 1 | x | 0 | 0 | n/a | n/a | n/a | n/a |
|   | 1 | 0 | 1 | x | 0 | 1 | 0 | -1 | -1 | -1 |
| 7 | 1 | 1 | 0 | x | 0 | 0 | n/a | n/a | n/a | n/a |
|   | 1 | 1 | 0 | x | 1 | 0 | 1 | 0 | 1 | 1 |
| 8 | 1 | 1 | 1 | x | 0 | 0 | n/a | n/a | n/a | n/a |
|   | 1 | 1 | 1 | x | 0 | 1 | n/a | n/a | n/a | n/a |
|   | 1 | 1 | 1 | x | 1 | 0 | n/a | n/a | n/a | n/a |
|   | 1 | 1 | 1 | x | 1 | 1 | 1 | 1 | 1 | 2 |
| | | | | | | | | Sum | -1 | 0 |

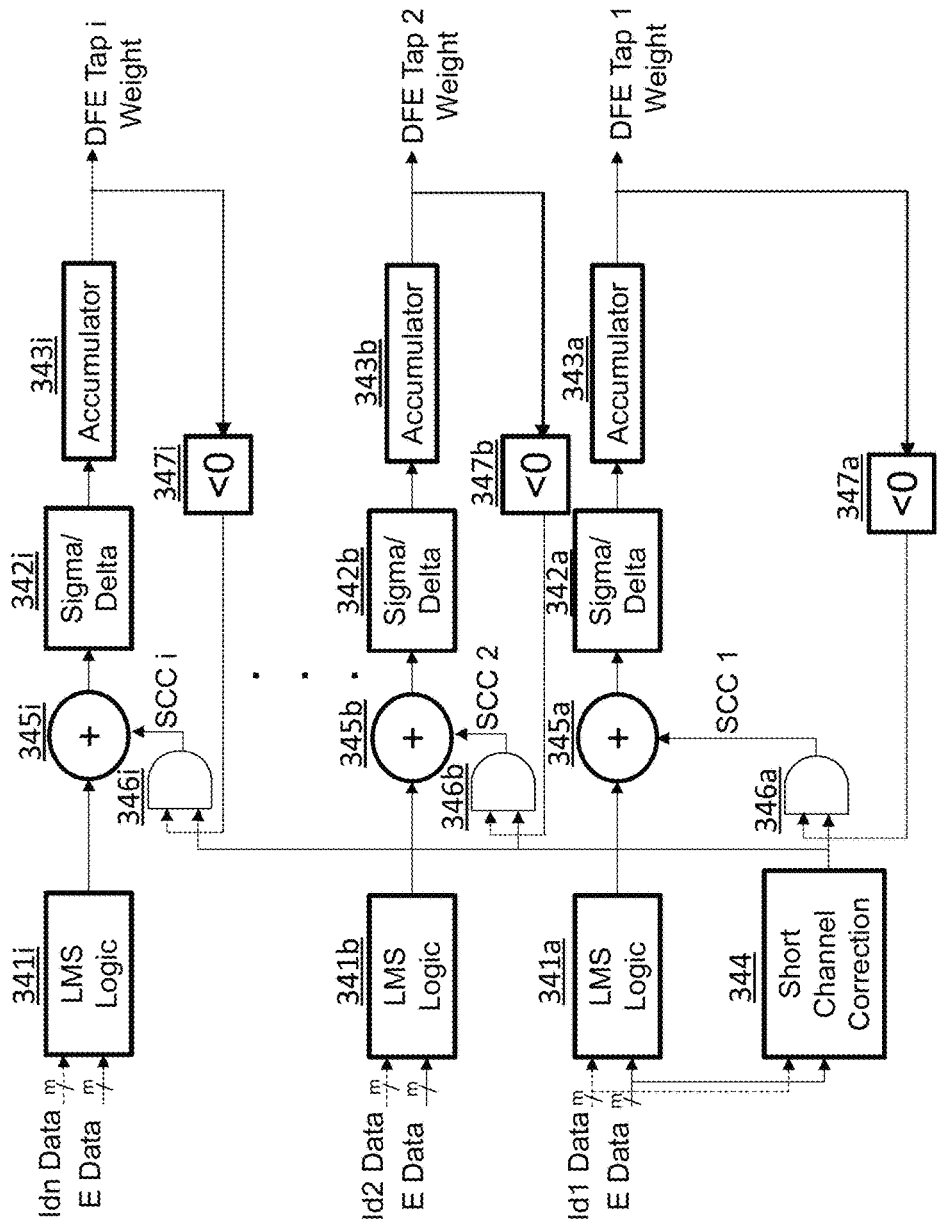

METHOD FOR PREVENTING MIS-EQUALIZATIONS IN DECISION FEEDBACK EQUALIZER BASED RECEIVERS FOR LOW LOSS CHANNELS

TECHNICAL FIELD

The present application relates to systems and methods for preventing mis-equalizations in decision feedback equalizer (DFE) based receivers for low-loss channels.

BACKGROUND

In various digital systems, signals can be transmitted from a transmitter to a receiver via a transmission channel. The transmission channel may be any suitable wired (or wireless) medium which links the transmitter to the receiver. However, in many instances (e.g., high data transmission speeds), the transmission channel becomes lossy. The transmission losses can be a result of, among other things, interference, attenuation, and delay in the channel. Further, such losses can also have considerable detrimental effect on the transmitted signal by the time it reaches the receiver. For example, sufficient amplitude and phase distortion of the transmitted signal may result in inter-symbol interference (ISI) in the signal received at the receiver. ISI generally refers to the 'smearing' of a pulse or other symbol representing the logic state of one data bit to the degree such that it contributes to the content of one or more of the preceding (i.e., pre-cursor ISI) or succeeding (i.e., post-cursor ISI) data bits.

To guard against such detrimental effects, many serial receiver systems perform decision feedback equalization (DFE) on the received data. Such serial receiver systems may include (i) an analog front end that provides some continuous time linear equalization (CTLE), (ii) a variable gain amplifier (VGA) (iii) a sampler, a (iv) DFE that uses the quantized receive data to adaptively feedback a correction signal, and (v) a timing recovery unit. The DFE adapts its feedback to minimize the error of the sampled signal at the center of the data bit. The sampler includes an error sampler that is used to detect this error signal. Generally, there is only one error sampler, and this error sampler has a positive threshold. These error samples (along with the data samples) are then de-serialized by a significant factor and provided to the DFE. At the DFE, digital logic computes an error correction signal (e.g., "+1," "0," or "−1") for each of the de-serialized error samples. After which, voting is applied to the set of error correction signals corresponding to the de-serialized word (i.e., combination of the de-serialized data bits) to generate a single error correction signal. Filtering is then applied to the generated single error correction signal to compute a digital tap weight for the DFE. This DFE tap weight may be fed back to the analog front end to perform a corrective operation on the incoming signal.

Most DFE-based receiver systems are designed with the assumption that the transmission channel is long. Further, for many of these channels, the attenuation is generally between 20-30 dB. As such, to compensate for the channel's attenuation, the transmitted signals are usually defined with large launch amplitudes. Although this makes sense for longer channels, in many situations the channel can be quite short or even non-existent. For example, many mobile applications use short channels due to the small feature size of hand-held devices (whereas many server applications have lossy channels due to the long circuit board traces and backplanes). Further, devices that use cables for communications, e.g., USB, must support both (i) lossy channels (i.e., due to long cables) and (ii) short channels (e.g., thumb drives). Most systems are designed to automatically adapt to a wide range of channels. With shorter (i.e., low loss) channels, the amplitude of the signal received at the receiver system will likely be larger than if the signal was transmitted via a longer channel. Large-amplitude signals can present a variety of problems for receiver systems that were originally designed to handle smaller amplitude ranges. For example, in order for the DFE feedback to operate properly, VGAs in DFE-based receivers have to adjust the signal's amplitude within a certain range. However, for large signals, the VGA will likely be unable to bring the signal amplitude within the appropriate operating range. Generally, if the amplitude of the signal is larger than the positive error threshold, the VGA will be unable to bring the signal within the appropriate operating range. Further, when the error samples for the positive data bits of the signal are predominately above the positive error threshold for a period of time, there will be no way for the DFE to determine the amount of distortion caused by the ISI. In this case, the DFE tap weights will randomly change based on the data pattern or, in some cases, drift with a negative bias causing the DFE weights to be large in magnitude and negative in sign, resulting in severe over-equalization. Although this severe over-equalization may have a small effect on the eye height, it may have a large, detrimental effect on the eye width at the receiver and also cause the timing recovery unit to lock to a non-optimal phase.

In order to address such problems, previous receiver systems included attenuators in the receive path. Similar to the attenuation in long channels, the attenuators attenuated the signal such that the VGA was able to bring the signal within the appropriate operating range. However, in many instances, the amplitude of the signal is still too large that the attenuation provided by the attenuator is not enough. Further, attenuators must be adaptively switched out for lossy channels to maintain an adequate signal. However, even with the adaption, the attenuators are complicated to control and require switches that distort the signal.

Accordingly, there is a need to prevent mis-equalization of signals transmitted over short transmission channels.

BRIEF DESCRIPTION OF THE DRAWINGS

FIG. 1A illustrates a block diagram in accordance with an example embodiment of the present invention.

FIG. 1B illustrates a block diagram of the digital receiver equalization control utilized in FIG. 1A.

FIG. 2A illustrates a plurality of 2 UI signal sequences in relation to an "I" threshold and "E" threshold.

FIG. 2B illustrates a truth table associated with the signals and thresholds of FIG. 2A.

FIG. 2C illustrates a truth table associated with a deserialization of 2.

FIG. 4 illustrates another digital receiver equalization control in accordance with an example embodiment of the present invention.

DESCRIPTION OF EMBODIMENTS

Figures 2D, 2E:
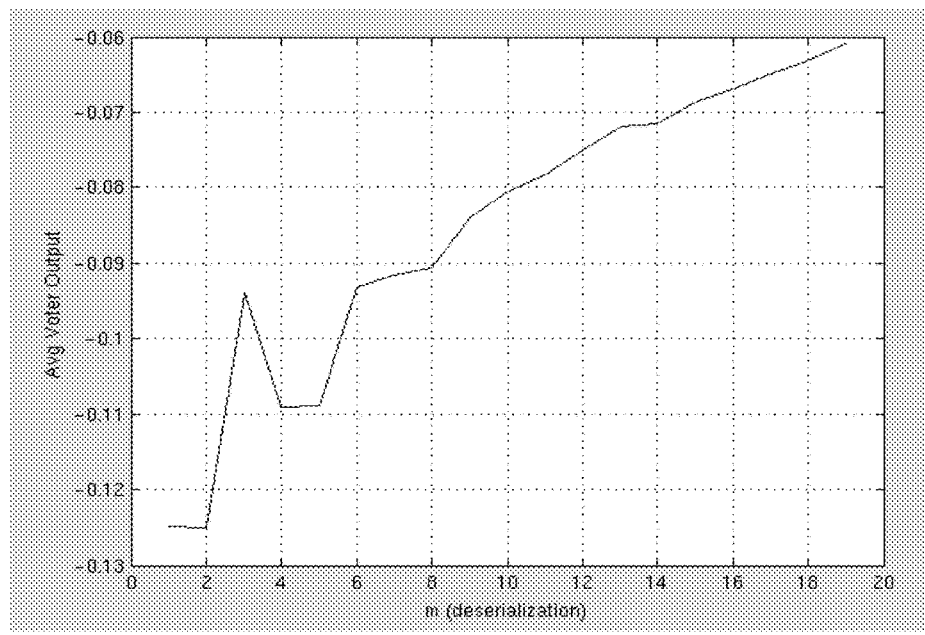
FIG. 2D illustrates a truth table associated with a 3-sample sequence of I and E data samples for a signal with a large amplitude.
FIG. 2E illustrates a graph of the average output of a voter during LMS with a large input signal vs. the type of deserialization.

The following description of embodiments provides non-limiting representative examples referencing numerals to particularly describe features and teachings of different aspects of the invention. The embodiments described should be recognized as capable of implementation separately, or in combination, with other embodiments from the description of the embodiments. A person of ordinary skill in the art reviewing the description of embodiments should be able to learn and understand the different described aspects of the invention. The description of embodiments should facilitate understanding of the invention to such an extent that other implementations, not specifically covered but within the knowledge of a person of skill in the art having read the description of embodiments, would be understood to be consistent with an application of the invention.

One aspect of the present disclosure is to provide systems and methods for preventing mis-equalization of signals transmitted over short transmission channels. The systems and the methods herein address at least one of the problems discussed above.

According to an embodiment, a system for preventing mis-equalizations of a signal received by a receiver over a transmission channel includes a digital receiver equalization control, wherein the digital receiver equalization control is configured to: receive, as inputs, (i) at least one in-phase (I) sample of the received signal, (ii) at least one error (E) sample of the received signal, and (iii) at least one current DFE tap weight; and selectively provide a correction signal to a following DFE tap weight based on the received inputs.

According to an embodiment, a method for preventing mis-equalizations of a signal received by a receiver over a transmission channel includes receiving, at a digital receiver equalization control of the receiver, inputs, the inputs including: (i) at least one in-phase (I) sample of the received signal, (ii) at least one error (E) sample of the received signal, and (iii) at least one current DFE tap weight; and selectively providing, with the digital receiver equalization control, a correction signal to a following DFE tap weight based on the received inputs.

According to an embodiment, a non-transitory computer-readable medium on which are stored instructions that are executable by a processor and that, when executed by the processor, cause the processor to perform a method for preventing mis-equalizations of a signal received by a receiver over a transmission channel, wherein the method includes: receiving, at a digital receiver equalization control of the receiver, inputs, the inputs including: (i) at least one in-phase (I) sample of the received signal, (ii) at least one error (E) sample of the received signal, and (iii) at least one current DFE tap weight; and selectively providing, with the digital receiver equalization control, a correction signal to a following DFE tap weight based on the received inputs.

According to an embodiment, a receiver includes: an analog front end, wherein the analog front end is configured to receive a signal from a transmitter; a sampler, wherein the sampler is configured to sample and quantize the received signal to generate at least one in-phase (I) sample and at least one error (E) sample of the received signal; a de-serializer, wherein the de-serializer is configured to de-serialize the sampled I and E samples; and a digital receiver equalization control, wherein the digital receiver equalization control is configured to selectively provide a correction signal to a following DFE tap weight based on: (i) the de-serialized I and E samples and (ii) at least one current DFE tap weight.

FIG. 1A illustrates a block diagram in accordance with an example embodiment of the present invention. As depicted in FIG. 1A, the block diagram includes a transmitter 100, a channel 200, and a receiver 300. In an embodiment, the receiver 300 includes an analog front end 310, a sampler 320, a de-serializer 330, a digital receiver equalization control 340, and a clock and data recovery unit 350 (e.g., timing recovery unit). The receiver 300 receives signals from the transmitter 100 via the channel 200. Specifically, the analog front end 310 of the receiver 300 receives the signals transmitted via the channel 200. In an embodiment, the analog front end 310 may include a VGA and/or an analog linear equalization (e.g., CTLE). Further, as depicted in the figure, the analog front end 310 also receives outputs from the digital receiver equalization control 340 and the sampler 320. Specifically, the analog front end 310 sums the weighted and delayed outputs from the sampler 320 to the received signal. The weight values are determined by the digital receiver equalization control 340. In an embodiment, the sampler 320 samples and quantizes the received signal in order to generate in-phase (I) and error (E) samples over a series of predetermined unit intervals (UI), with each E sample being disposed at the center of the I sample. In an embodiment, the sampler includes an error sampler that samples the E sample in relation to a positive threshold. Any E samples above the threshold will be associated with a logical value of "1" and any E samples below the threshold will be associated with a logical value of "0." The sampler 320 samples the received signal based on a plurality of clock signals output from the clock and data recovery unit 350. In an embodiment, the sampler 320 sends the sampled data to (i) the analog front end 310 and (ii) the de-serializer 330. The de-serializer 330 de-serializes the quantized data and provides the de-serialized data to the digital receiver equalization controller 340 and the clock and data recovery unit 350. In an embodiment, the de-serializer 330 samples the quantized E and I data at the center of the I sample. In an embodiment, the de-serialized data received by the digital receiver equalization controller 340 is de-serialized by a factor different than the de-serialized data received by the clock and data recovery unit 350. For example, as depicted in the figure, (i) the digital receiver equalization controller 340 receives data that is de-serialized for m bits and (ii) the clock and data recovery unit 350 receives data that is de-serialized for n bits. In an embodiment, the digital receiver equalization controller 340 runs at a slower clock rate than the clock and data recovery 350. Accordingly, the data provided to the digital receiver equalization controller 340 will be de-serialized for a greater number of bits (e.g., 16-20 bits) than the data provided to the clock and data recovery 350 (e.g., 4 bits). In an embodiment, the digital receiver equalization controller 340 carries out predetermined control processing for the equalization utilized by the receiver based on data received from the de-serializer 330, and feeds back various equalization information to the analog front end 310 to perform the corrective operation. For example, the digital receiver equalization controller 340 sends the DFE weights, the VGA gain, and the CTLE settings to the analog front end 310. As a feedback equalizer, the sampler 320 generally makes a logic 1-or-0 decision on the sampled data. The decision is scaled, shifted, and delayed and then fed back to the analog front end 310, where it is added back into the received data. For example the DFE will add a value of +c or −c based on the logic 1-or-0 decision of the previous sample, where c is the first DFE tap weight. Therefore, the DFE establishes a feedback loop where the decision is made in that loop. A notable advantage of a DFE is that since a decision is made on the data—either a logic 1 or a logic 0—the DFE effectively provides for substantially noiseless operation. Accordingly, the ISI in the channel 200 may be addressed without introducing additional noise in the process. Further, in an embodiment, the clock and data recovery 350 receives data samples from the de-serializer 330 and, based on the data, determines if the sampler 320 is running too slow or too fast. Then, in order to correct the late or early clock rate of the sampler 320, the clock and data recovery 350 generates a plurality of clocks to provide to the sampler 320.

FIG. 1B illustrates a block diagram of the digital receiver equalization control utilized in FIG. 1A. As depicted in FIG. 1B, the digital receiver equalization control 340 includes sign-sign least-mean-square (LMS) logic 341, sigma-delta modulator 342, and accumulator 343. In an embodiment, the LMS logic 341 receives a plurality of de-serialized data samples from the de-serializer 330. For example, as depicted in the figure, the de-serializer 330 transmits the de-serialized I and E data samples to the LMS logic 341. The LMS logic 341 generates an error correction signal (e.g., "+1," "0," or "−1") for each of the de-serialized E samples based on the correlation between the received I and E data samples. In an embodiment, for a 1-tap DFE, the LMS logic 341 looks at the effect a previous I sample $I_d$ has on the error (i.e., E sample) of an instant I sample, and generates a correction signal accordingly. In an embodiment, sample I and $I_d$ are consecutive and are separated in time by 1 UI. For example, consider the case where the instant I sample is a logic 1, and the previous I sample is a logic 0. If the E sample associated with the instant I sample is above the error threshold, then the signal is likely over-equalized and, therefore, the DFE tap weight needs to be reduced (i.e., −1). On the other hand, if the E sample associated with the instant I sample is below the error threshold, then the signal is likely under-equalized and, therefore, the DFE tap weight needs to be increased (i.e., +1). In embodiment, the LMS logic 341 performs this error correction analysis for each of them de-serialized samples of the $I_d$, I, and E data samples. After the m error correction signals are determined, the LMS logic 341 performs a voting on the m correction signals to generate a single error correction signal for the m de-serialized samples. In an embodiment, the voting selects whatever the majority of the m error correction signals are as the single error correction signal. For example, if the majority of the m error correction signals are associated with a value of "+1," then the LMS logic 341 will select "+1" as the single error correction signal. Similarly, if the majority of the m error correction signals are associated with a value of "−1," then the LMS logic 341 will select "−1" as the single error correction signal. The LMS logic 341 will then provide the single error correction signal to the sigma-delta modulator 342 for filtering. In an embodiment, the sigma-delta modulator 342 is a first-order sigma-delta modulator. In an embodiment, the sigma-delta modulator 342 counts and adds the number of "+1s" and "−1s" coming in until either a positive or negative threshold is hit. For example, if the DFE had a six-bit control plus a sign bit, the sigma-delta modulator 342 will continue adding and counting the stream of "+1s" and "−1s" coming in until either a "+63" or "−63" is hit. If the positive threshold is reached, the sigma-delta modulator 342 transmits an increment signal (i.e., "+1") to the accumulator 343. On the other hand, if the negative threshold is reached, the sigma-delta modulator 342 transmits a decrement signal (i.e., "−1") to the accumulator 343. In an embodiment, after the sigma-delta modulator 342 reaches the positive or negative threshold, the count and sum at the sigma-delta modulator 342 are reset to "0." Further, in an embodiment, the value at the accumulator (i.e., "+1" or "−1") is output as the DFE tap weight.

FIG. 2A illustrates a plurality of 2 UI signal sequences in relation to an "I" threshold and "E" threshold. Specifically FIG. 2A depicts signals A, B, C, and D in relation to the "I" and "E" thresholds. Accordingly, the $I_d$, I, and E samples of signals A, B, C, and D can be easily determined.

FIG. 2B illustrates a truth table associated with the signals and thresholds of FIG. 2A. For example, as regards to signal A, the $I_d$ sample is 0, the I sample is 1, and the E sample is 0. As regards to signal B, the $I_d$ sample is 0, the I sample is 1, and the E sample is 1. As regards to the signal C, the $I_d$ sample is 1, the I sample is 1, and the E sample is 0. Lastly, as regards to signal D, the $I_d$ sample is 1, the I sample is 1, and the E sample is 1. Further, the truth table also includes the error correction signal (e.g., up/down signal) for each of the signals. An error correction signal of "1" corresponds to an "up" signal, an error correction signal of "−1" corresponds to a down signal, and an error correction signal of "0" corresponds to no change. Accordingly, the error correction signals for signals A, B, C, and D are "1," "−1," "−1," and "1," respectively.

FIG. 2C illustrates a truth table associated with a deserialization of 2. A 3-sample sequence corresponds to a consecutive sequence of I an E data samples. The consecutive sequence of I data samples is I0, I1, and I2 and the consecutive sequence of E data samples is E0, E1, and E2. Further, the truth table takes into account that the E sampler only has a positive threshold and, therefore, the combinations of possible E samples are only shown for the case where I=1 at the same sample time (e.g., I0=1 or I1=1 or I2=1). If the I sample is 0, then the corresponding E sample must be 0 (i.e., since the E threshold is above the I threshold) and, therefore, these samples are not used to update the DFE. The truth table also includes a first and second error correction signal as well as a vote output corresponding to the error correction signals. In an embodiment, the first and second error correction signals are determined based on LMS logic applied to the previous I sample and the instant I and E samples. For example, the first error correction signal is determined based on the previous I sample I0 and the instant I and E samples I1 and E1, respectively. Similarly, the second error correction signal is determined based on the previous I sample I1 and the instant I and E samples I2 and E2, respectively. Further, as depicted in the figure, the E0 samples are not relevant since there isn't a previous I data sample before I0. Further, as regards to the vote outputs associated with the error correction signals: (i) if both of the error correction signals are 0, then the vote will also be 0; (ii) if both of the error correction signals are 1, the vote will also be 1; (iii) if both of the error correction signals are −1, the vote will also be −1; (iv) if one of the correction signals is 0 and the other is 1, then the vote will be 1; (v) if one of the correction signals is 0 and the other is −1, then the vote will be −1; and (vi) if one of the correction signals is 1 and the other is −1, then the vote will be 0.

FIG. 2D illustrates a truth table associated with a 3-sample sequence of I and E data samples for a signal with a large amplitude. In other words, the truth table corresponds to the case where the amplitude is greater than the positive threshold of the E sampler (and, therefore, the I threshold). As such, even with significant ISI, the I sample will always correspond to the E sample. In other words, the I and E samples associated with the same sample time will both be 1. For cases that violate this condition the outputs are labeled as not-applicable (n/a). As depicted in the truth table, for a 2-bit de-serialized sequence, there are eight possible outcomes (including the I sample sequence 0-0-0). Further, unlike the truth table in FIG. 2C, the truth table in FIG. 2D also includes a score for each of the eight outcomes. The score is essentially a sum of the corresponding first and second error corrections signals. Further, the truth table also includes a sum of the votes of each of the eight outcomes. As depicted in the figure, the sum of the votes is equal to −1. As such, the average vote output for a random data sequence is −⅛. In other words, for a 2-bit de-serialized sequence, there is a negative bias in the DFE direction just because the amplitude of the signal is too large. The truth table also includes a sum of the scores of each of the eight outcomes. As depicted in the figure, the sum of the score is 0 (and, therefore, the average is also 0). In other words, for the scored output, there is no negative bias. However, in this case, the DFE taps would be completely dependent on the data pattern and not the ISI in the channel. Therefore, the DFE taps will wander around randomly.

FIG. 2E illustrates a graph of the average output of a voter during LMS with a large input signal vs. the type of deserialization. Specifically, the graph is a plot of the average voter output for 1-tap DFE assuming: (i) all of the E samples are above the positive threshold when the I sample is 1, (ii) deserialization of m, (iii) random data is received and (iv) the deserialization is followed by a voter. As depicted in the graph, each value of m produces a negative bias into the DFE that drives the taps negative. However, for higher values of m, the average is less negative. Therefore, even though the taps still go negative, they will go negative at a slower rate.

Figure 3A:
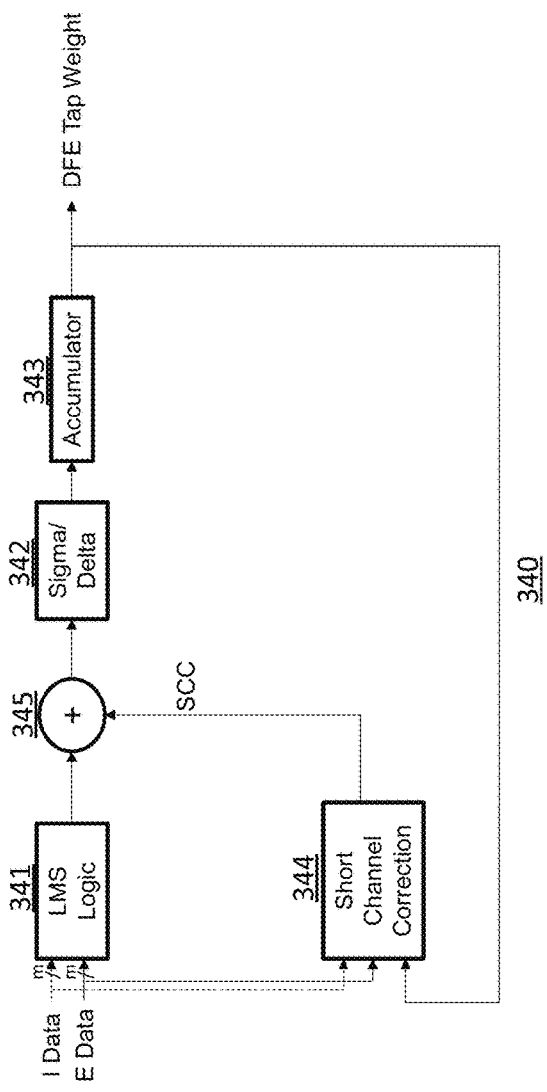
FIG. 3A illustrates a digital receiver equalization control in accordance with an example embodiment of the present invention.

FIG. 3A illustrates a digital receiver equalization control in accordance with an example embodiment of the present invention. In an embodiment, unlike the digital receiver equalization control 340 in FIG. 1B, the digital receiver equalization control 340 also includes a short channel correction 344 and an adder 345. As depicted in the figure, the short channel correction 344 receives, as inputs, the de-serialized I and E data and the DFE tap weight. Further, in an embodiment, the adder 345 (i) receives, as inputs, the output of the LMS logic 341 and the output of the short channel correction 344 and (ii) outputs the sum to the sigma-delta modulator. In an embodiment, the short channel correction 344 can be used to compensate for the negative bias in the DFE when the amplitude of the signal is too large. If the I and E data coming into the digital receiver equalization control 340 matches for a long period of time, it can be assumed that the transmission channel is short. As such, in the event a short channel is detected, the short channel correction 344 transmits a "+1" to the adder 345 for a single word clock cycle. Accordingly, the output of the adder 345 will cause the sigma-delta modulator 342 to reach the positive threshold much faster and, therefore, increment the accumulator 343 and the DFE tap weight by 1.

Figure 3B:
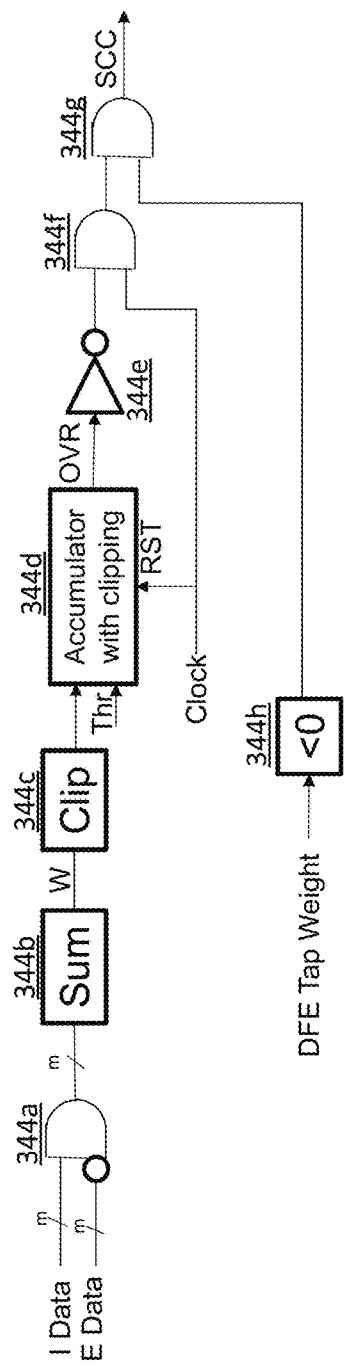
FIG. 3B illustrates a block diagram of the short channel correction utilized in FIG. 3A.

FIG. 3B illustrates a block diagram of the short channel correction utilized in FIG. 3A. As depicted in the figure, the short channel correction 344 includes a first logic AND gate 344a, a summer 344b, a clipper 344c, an accumulator 334d, an inverter 344e, a second logic AND gate 344f, a third logic AND gate 344g, and logic element 344h. In an embodiment, the first logic AND gate 344a receives, as inputs, the de-serialized I and E data. Further, the first logic AND gate 344a includes an inverter at its input for the received E data. As such, the first logic AND gate 344a only outputs a "1" when the received I data is 1 and the received E data is 0 (i.e., when the error is below the threshold), otherwise the first logic AND gate 344a will always output a zero. In an embodiment, the first logic AND gate 344a outputs a value for each pair of de-serialized I and E data being input. As such, the first logic AND gate 344a will output m values. In an embodiment, the m output values are fed to the summer 344b to generate a sum W. In an embodiment, sum W can range from 0 to m. As such, the sum W indicates the total number of I samples in the word (i.e., combination of them de-serialized data samples) where the E samples are below the error threshold. Further, in an embodiment, the sum W can be fed into the clipper 344c. The clipper 344c can clip the value of the sum W at a much smaller number. For example, if the clip value was 4 and the sum W was 20, the clipped value would be 4. On the other hand, if the sum W was 3, then the clipped value would also be 3. The clipper 344c then provides the clipped value to the accumulator 344d. In another embodiment, the sum W is not clipped by the clipper 344c and, instead, is fed directly to the accumulator 344d. As depicted in the figure, the accumulator also receives, as an input, a count threshold value. In an embodiment, the accumulator 344d counts, on a word basis, the total number of samples that are below the error threshold for L words. In an embodiment, the accumulator 344d also includes a comparator (not shown) that compares the accumulator count value to the count threshold value. As such, if the accumulator count value surpasses the count threshold value, the accumulator 344d will output an overflow value OVR of 1. However, if the accumulator count value remains under the count threshold value, the accumulator 344d will output an OVR of 0. At the end of L word clock cycles, the accumulator 344d outputs the OVR value to an inverter 344e. In another embodiment, the accumulator 344d clips the accumulated amount value at the count threshold value upon reaching the count threshold value. In an embodiment, the accumulator 344d is reset at the end of the L word clock cycles. As such, the accumulator count value goes back to 0. In an embodiment, the output from the inverter 344e is fed to the second logical AND gate 344f. In an embodiment, the second logical AND gate 344f also receives a clock signal. The clock signal is high (i.e., "1") for one word cycle and then low (i.e., "0") for L−1 word cycles. As such, after L word cycles, the clock signal is high again. In an embodiment, if the OVR value is 0 (i.e., the accumulator count value remains under the count threshold value), then the second logical AND gate 344f will receive a 1 at its first input and, at the start of the new L word cycle, a 1 at its second input. However, if the OVR is 1 (i.e., the accumulator count value surpasses the count threshold value), the second logical AND gate 344f will receive a 0 at its first input. The output of the second logical AND gate 344f is fed into the first input of the third logical AND gate 344g. In an embodiment, the third logical AND gate 344g also receives the result of the logical element 344h at its second input. In an embodiment, the logical element 344h determines if the DFE tap weight is negative. If the current DFE tap weight is negative, the logical element 344h outputs a 1, otherwise it outputs a 0. As such, at the end of the L word cycle, if the accumulator 344d does not indicate an over-flow (i.e., OVR=1) and the DFE tap is negative, then the short channel correction (SCC) is asserted for a single word clock cycle.

In other words, if the I and E data match for a significant portion during the L word clock cycles, the short channel correction will be asserted in order to compensate for the negative bias inherent to the short channel. Otherwise, if the I and E data do not match for a significant portion of the L word clock cycle, the short channel correction will likely need not to be asserted. However, as stated previously above, the short channel correction can only be asserted after it is determined that the DFE tap weight is negative. If the DFE tap weight is not negative, then there is likely less of a chance that the DFE system will inadvertently over-equalize and, therefore, the short channel correction would not be necessary.

In an embodiment, if the deserialization value m was 16, the average negative bias would be approximately −0.07 (see FIG. 2E). As such, L should be set to a value that is less than 1/.07. For example, L can be 10. Therefore, the total number of UI is 160 (16×10 UI). In other words, the L word clock cycle is 160 UI. In an embodiment, the count threshold value can be modified depending on the desired restrictiveness for the short channel correction. For example, the most restrictive setting for the count threshold value is 1. In other words, if any sample in 160 UI indicates that an E sample was below the threshold (i.e., E=0), then the short channel correction will not be asserted.

In another embodiment, the accumulator $344d$ can use a valid word counter to start (and reset) instead of a fixed timer. For example, the valid word counter can count the number of valid words, and when it reaches a threshold of L words, the start signal would be asserted and the counter would be reset. Then, the valid word counter would count for the next L valid words. In an embodiment, a word is considered valid is there is at least one I sample with positive data (e.g., 1=1). If none of the data bits in the word are 1, then it is not possible to detect if the data is above or below threshold since all of the E samples will be 0 no matter what the amplitude is.

Figure 3C:
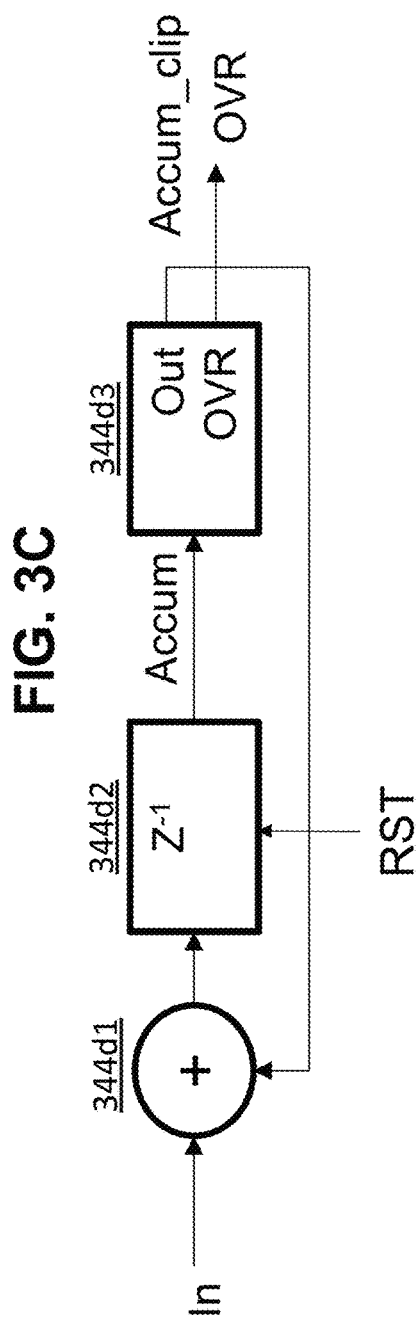
FIG. 3C illustrates a block diagram of the accumulator utilized in FIG. 3B.

FIG. 3C illustrates a block diagram of the accumulator utilized in FIG. 3B. As depicted in the figure, the accumulator $344d$ includes an adder $344d1$, delay element $344d2$, and clipper $344d3$. In an embodiment, the adder $344d1$ receives, at a first input, the sum W (or the clipped value) and receives, at a second input, the accumulated count value from the clipper $344d3$. In an embodiment, at the start of the L word clock cycle, the accumulated count value is 0. The adder $344d1$ outputs the sum of the first and second inputs to the delay element $344d2$. The delay element $344d2$ then provides the sum to the clipper $344d3$. In an embodiment, the clipper includes a comparator that compares the sum from the adder $344d1$ to the count threshold value. In an embodiment, if the sum from the adder $344d1$ reaches the count threshold value, the accumulated count value is clipped at the count threshold value until the end of the L word clock cycle and an overflow condition is asserted (i.e., OVR=1). However, if the accumulated count value remains below the count threshold value during the L word clock cycle, the output of the clipper $344d3$ is fed back into the second input of the adder $344d1$. As mentioned previously above, the accumulator $344d$ accumulates the count value for L word clock cycles. At the end of the L word clock cycle, the accumulator $344d$ will output the OVR value (e.g., either 1 or 0) to the inverter $344e$. At the beginning of the next L word clock cycle, the delay element $344d2$ receives a reset signal RST and, therefore, resets the accumulated count value and OVR value to 0. As such, the clipper $344d3$ will output a value of 0 to the second input of the adder $344d1$.

Figure 3D:
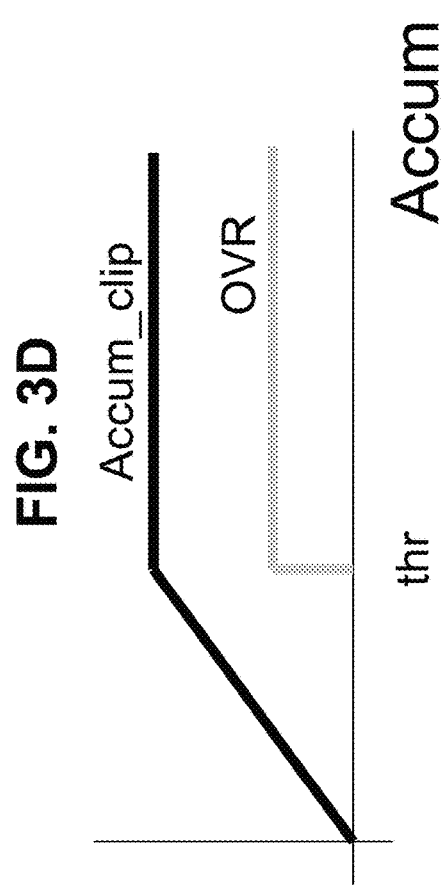
FIG. 3D illustrates a graph of the clipped accumulator output and OVR output as a function of the accumulator input.

FIG. 3D illustrates a graph of the clipped accumulator output and OVR output as a function of the accumulator input. As depicted in the figure, the accumulated count value continues to accumulate until it reaches the count threshold value. At that point, the accumulated count value is clipped at the count threshold value for the remaining of the L word clock cycle and the overflow condition is asserted (i.e., OVR=1).

FIG. 4 illustrates another digital receiver equalization control in accordance with an example embodiment of the present invention. In an embodiment, FIG. 4 depicts the short channel correction for an i-tap DFE controller. For example, the DFE control for tap 1 includes LMS logic $341a$, adder $345a$, sigma-delta modulator $342a$, accumulator $343a$, logic AND gate $346a$, and a logic element $347a$. Further, the DFE control for tap 2 includes LMS logic $341b$, adder $345b$, sigma-delta modulator $342b$, accumulator $343b$, logic AND gate $346b$, and a logic element $347b$. Similarly, the DFE control for tap i includes LMS logic $341i$, adder $345i$, sigma-delta modulator $342i$, accumulator $343i$, logic AND gate $346i$, and a logic element $347i$. Further, as depicted in the figure, each of the DFE tap controls share the short channel correction 344. As such, anytime a short channel correction is asserted, it can be applied to all three taps. In an embodiment, the LMS logic $341a$ to $341i$ determine, via delays, which DFE taps to adapt. In an embodiment, tap 1 corresponds to an instant I sample Id1, tap 2 corresponds to a previous I sample Id2, and tap i corresponds to an I sample Idi that is before tap 2. In an embodiment, taps 1 and 2 are separated from each other by 1 UI and taps 2 and i are separated from each other by i-2 UI. Further, the short channel correction 344 is applied to each of the taps via the logic AND gates $346a$ to $346i$. Specifically, based on the output from the logical elements $347a$ to $347i$, the logic AND gates $346a$ to $346i$ determine whether the short channel correction should be applied to a certain tap. For example, if the current DFE tap 1 weight is negative, the logic element $347a$ (which determines whether an input is negative) will output a 1. The logic AND gate $346a$ receives this output and, if the short channel correction 344 is being asserted (i.e., the output is 1), the logic AND gate $346a$ will apply the short channel correction to tap 1. However, if the current DFE tap 1 weight is not negative (i.e., the logic element $347a$ will output a 0) or the short channel correction 344 is not being asserted (i.e., the output is 0), then a short channel correction will not be applied to tap 1.

In the foregoing Description of Embodiments, various features may be grouped together in a single embodiment for purposes of streamlining the disclosure. This method of disclosure is not to be interpreted as reflecting an intention that the claims require more features than are expressly recited in each claim. Rather, as the following claims reflect, inventive aspects lie in less than all features of a single foregoing disclosed embodiment. Thus, the following claims are hereby incorporated into this Description of the Embodiments, with each claim standing on its own as a separate embodiment of the invention.

Moreover, it will be apparent to those skilled in the art from consideration of the specification and practice of the present disclosure that various modifications and variations can be made to the disclosed systems without departing from the scope of the disclosure, as claimed. Thus, it is intended that the specification and examples be considered as exemplary only, with a true scope of the present disclosure being indicated by the following claims and their equivalents.

What is claimed is:

1. A system for preventing mis-equalizations of a signal received by a receiver over a transmission channel, the system comprising:
 a digital receiver equalization control, wherein the digital receiver equalization control is configured to:
 receive, as inputs, (i) at least one in-phase (I) sample of the received signal, (ii) at least one error (E) sample of the received signal, and (iii) at least one current decision feedback equalization (DFE) tap weight; and
 selectively provide a correction signal to a following DFE tap weight based on determining that logical values associated with the at least one I sample and the at least one E sample match,
 wherein the correction signal is provided to the following DFE tap weight upon determining that: (i) a plurality of I and E samples are associated with a logical value of 1, wherein the plurality of I and E samples exceed a threshold, and (ii) the at least one current DFE tap weight is associated with a negative value.

2. The system of claim 1, wherein the correction signal increments the following DFE tap weight.

3. The system of claim 1, wherein each of the at least one I samples and the at least one E samples are de-serialized by an m-bit de-serializer, wherein m is an integer greater than 1.

4. The system of claim 3, wherein the correction signal is asserted for a single word clock cycle, wherein a single word corresponds tom number of I samples.

5. The system of claim 4, wherein the plurality of I and E samples are accumulated over L word clock cycles, wherein L is an integer greater than 1.

6. The system of claim 5, wherein an accumulation value associated with the plurality of I and E samples is reset after the L word clock cycles.

7. The system of claim 1, wherein the correction signal is provided to a plurality of DFE tap weights.

8. The system of claim 1, wherein the digital receiver equalization control is further configured to:
 output the following DFE tap weight to an analog front end of the receiver.

9. A method for preventing mis-equalizations of a signal received by a receiver over a transmission channel, the method comprising:
 receiving, at a digital receiver equalization control of the receiver, inputs, the inputs including: (i) at least one in-phase (I) sample of the received signal, (ii) at least one error (E) sample of the received signal, and (iii) at least one current decision feedback equalization (DFE) tap weight; and
 selectively providing, with the digital receiver equalization control, a correction signal to a following DFE tap weight based on determining that logical values associated with the at least one I sample and the at least one E sample match,
 wherein the digital receiver equalization control provides the correction signal to the following DFE tap weight upon determining that: (i) a plurality of I and E samples are associated with a logical value of 1, wherein the plurality of I and E samples exceed a threshold; and (ii) the at least one current DFE tap weight is associated with a negative value.

10. The method of claim 9, wherein the correction signal increments the following DFE tap weight.

11. The method of claim 9, wherein each of the at least one I samples and the at least one E samples are de-serialized by an m-bit de-serializer, wherein m is an integer greater than 1.

12. The method of claim 11, wherein the correction signal is asserted for a single word clock cycle, wherein a single word corresponds tom number of I samples.

13. The method of claim 12, wherein the plurality of I and E samples are accumulated over L word clock cycles, wherein L is an integer greater than 1.

14. The method of claim 13, wherein an accumulation value associated with the plurality of I and E samples is reset after the L word clock cycles.

15. The method of claim 9, wherein the correction signal is provided to a plurality of DFE tap weights.

16. A receiver, comprising:
 an analog front end, wherein the analog front end is configured to receive a signal from a transmitter;
 a sampler, wherein the sampler is configured to sample and quantize the received signal to generate at least one in-phase (I) sample and at least one error (E) sample of the received signal;
 a de-serializer, wherein the de-serializer is configured to de-serialize the at least one I sample and the at least one E sample; and
 a digital receiver equalization control, wherein the digital receiver equalization control is configured to selectively provide a correction signal to a following decision feedback equalization (DFE) tap weight based on: (i) determining that logical values associated with the de-serialized at least one I sample and at least one E sample match and (ii) at least one current DFE tap weight,
 wherein the digital receiver equalization control provides the correction signal to the following DFE tap weight upon determining that: (i) a plurality of I and E samples are associated with a logical value of 1, wherein the plurality of I and E samples exceed a threshold; and (ii) the at least one current DFE tap weight is associated with a negative value.

17. The receiver of claim 16, wherein the correction signal is provided to a plurality of DFE tap weights.

* * * * *